(12) United States Patent
Mori et al.

(10) Patent No.: US 7,689,449 B1
(45) Date of Patent: Mar. 30, 2010

(54) MESSAGE PROCESSING APPARATUS, MESSAGE PROCESSING SYSTEM, MESSAGE MANAGING METHOD, AND STORAGE MEDIUM STORING MESSAGE MANAGEMENT PROGRAM

(75) Inventors: Toshiki Mori, Kanagawa (JP); Minoru Kuriki, Kanagawa (JP); Yasuyuki Jinbo, Kanagawa (JP); Kiyoto Naganuma, Kanagawa (JP); Masao Aihara, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 1475 days.

(21) Appl. No.: 09/487,265

(22) Filed: Jan. 19, 2000

(30) Foreign Application Priority Data

May 21, 1999 (JP) .................................. 11-140960

(51) Int. Cl.
*G06Q 99/00* (2006.01)
(52) U.S. Cl. .................................... 705/9; 705/8; 705/1
(58) Field of Classification Search ...................... 705/1, 705/7, 8, 9
See application file for complete search history.

(56) References Cited

U.S. PATENT DOCUMENTS

| | | | | |
|---|---|---|---|---|
| 5,301,320 A | * | 4/1994 | McAtee et al. .................. | 705/9 |
| 5,725,384 A | | 3/1998 | Ito et al. | |
| 5,765,140 A | * | 6/1998 | Knudson et al. ................ | 705/9 |
| 5,907,490 A | * | 5/1999 | Oliver .......................... | 700/90 |
| 5,918,226 A | | 6/1999 | Tarumi et al. | |
| 6,092,048 A | * | 7/2000 | Nakaoka ......................... | 705/9 |
| 6,370,508 B2 | * | 4/2002 | Beck et al. ...................... | 705/1 |

FOREIGN PATENT DOCUMENTS

| | | |
|---|---|---|
| JP | 2-128546 | 5/1990 |
| JP | 8-292937 | 11/1996 |
| JP | 9-34956 | 2/1997 |
| JP | 9-91234 | 4/1997 |
| JP | 9-134392 | 5/1997 |
| JP | 9-171529 | 6/1997 |
| JP | 10-56477 | 2/1998 |
| JP | 10-240822 | 9/1998 |

OTHER PUBLICATIONS

Office Action mailed on Mar. 25, 2008 and issued in corresponding Japanese Patent Application No. 11-140960.
Japanese Office action issued Feb. 27, 2007 in the corresponding Japanese application No. 11-140960.

* cited by examiner

*Primary Examiner*—Akiba K Robinson Boyce

(57) ABSTRACT

It is determined whether or not a transmitter has issued a request to display a completion state table, whether or not the current date and time have reached the date and time specified by the transmitter, whether or not an opening rate has exceeded a predetermined value, or whether or not a completion rate has exceeded a predetermined value. When any of these conditions is satisfied, a completion state table containing information such as the number of receivers who have opened the message, the opening rate, the number of receivers who have completed their jobs associated with the message, the completion rate, etc. is forcibly displayed on a terminal device.

15 Claims, 18 Drawing Sheets

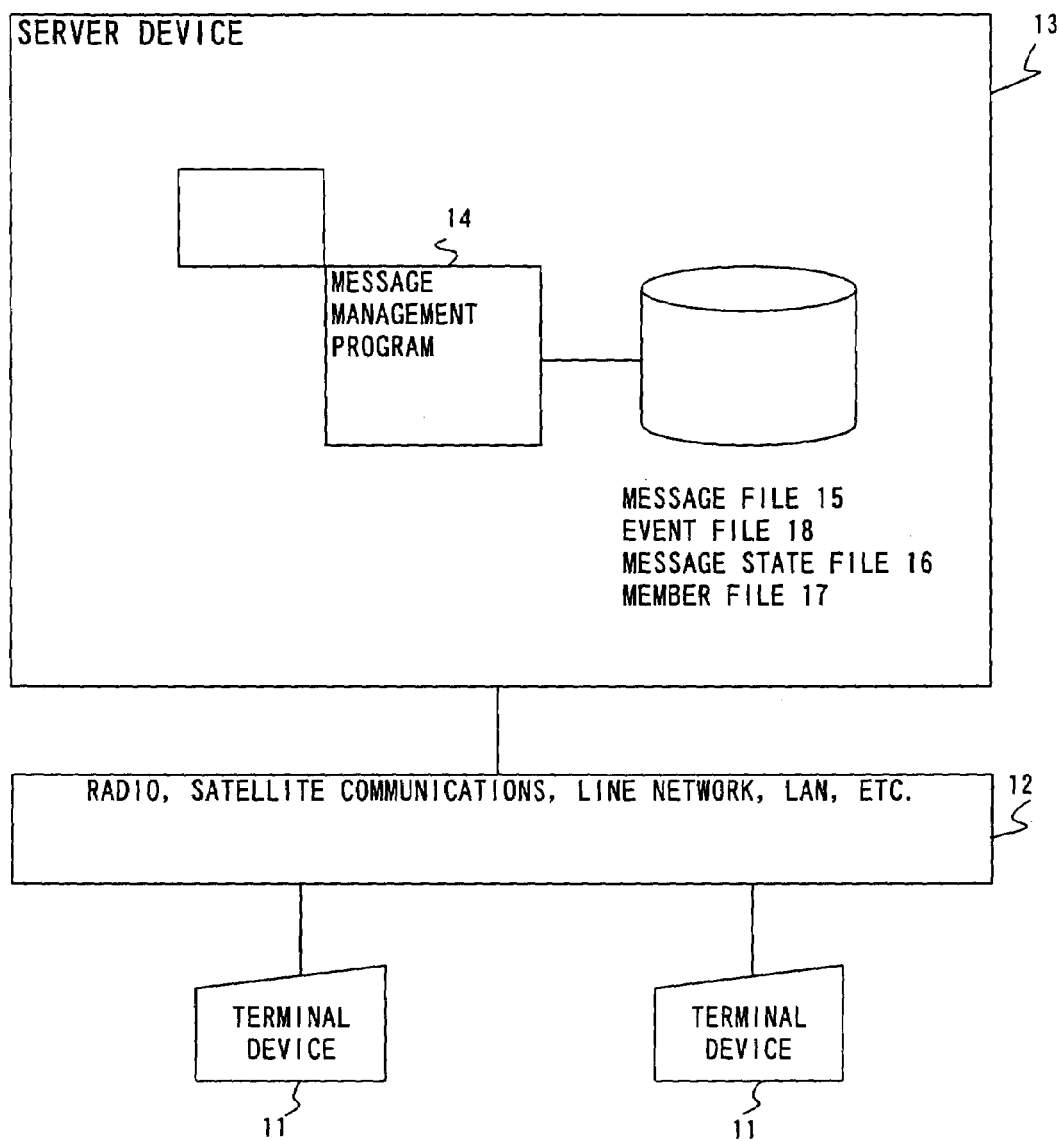
F I G. 1

| CODE | CONTENTS |
|---|---|
| 1 | SUPPRESSING TRANSFER FUNCTION (NOT TO BE TRANSFERRED) |
| 2 | SUPPRESSING TRANSFER FUNCTION (DISPLAYING WARNING MESSAGE WHEN MESSAGE IS TRANSFERRED) |
| 3 | FORCIBLE DISPLAY OF CONFIDENTIAL MESSAGE (CHANGE IN COLOR OF TITLE, ETC.) |

F I G. 3

| CODE | CONTENTS |
|---|---|
| 1 | AUTOMATIC DELETION WHEN ALL RECEIVERS HAVE COMPLETED |
| 2 | AUTOMATIC DELETION WHEN RECEPTION IS COMPLETED |
| 3 | CAN BE DELETED BY TRANSMITTER OR RECEIVER |
| 4 | CAN BE DELETED BY TRANSMITTER |

FIG. 4

| 18 | 18a | 18b | 18c | 18d | 18e | 18f |
|---|---|---|---|---|---|---|
| EVENT CODE | 1 LEVEL | 2 LEVEL | 3 LEVEL | MESSAGE ID | TITLE | |
| | | | | | | |
| 210918 | □□OPERATION | ▲▲GENERATION UPDATE | ○○MATERIAL | 000003 | ●●MEETING | |
| 210919 | | | ×○PROCESSED | 000020 | □△CHANGED | |
| 834701 | ●△CONFERENCE RESEARCH | ××ACTUAL RESULT | △△GENERATED | 000036 | ●△CONFERENCE | |

| | 18g | 18h | 18i |
|---|---|---|---|
| | CONTENTS | PLANNED DATE OF TRANSMISSION | COMPLETION OF TRANSMISSION |
| | | | |
| | GENERATING PRELIMINARY MATERIAL | 1999/02/03 | ■YES |
| | CHECKING METHOD IS ...... | 1999/03/15 | □ |
| | SCHEDULE IS ..... | 1999/04/02 | □ |

20

| 20a | 20b |
|---|---|
| EVENT CODE | MEMBER ID |
| 210918 | 625491 |
| 210918 | 760057 |
| 834701 | 980045 |
| 900031 | 547923 |
| 900031 | 342077 |

FIG. 5

| | TRANSMISSION ☐ | | COMPLETION ☐ |
|---|---|---|---|
| DESTINATION | 岡目清子　　海原広 | | |
| TRANSMISSION DATE | 1999/02/01 | | |
| TITLE | REQUEST OF △△ | | |
| TEXT | RELATING TO THE TITLE △△ ····· | | |
| TRANSMITTER | 事象有無 | | |
| TERM | 1999/02/24　　OFFERED TERM: | | |
| CONFIDENTIAL MESSAGE | NO TRANSFER FUNCTION ☐　　TRANSFER SUPPRESSED ☐ EMPHASIZED DISPLAY ☐ | | |
| DELETION | DELETED AT COMPLETION BY ALL RECEIVERS ☐ CAN BE DELETED BY RECEIVER ☐ CAN BE DELETED ONLY BY TRANSMITTER ■ | | |

TRANSMISSION BY DEVELOPMENT　　PERIOD　1999/02/12 — 1999/02/28

COMPLETION STATE TABLE　■　　REQUESTED TERM TABLE　☐

F I G. 7

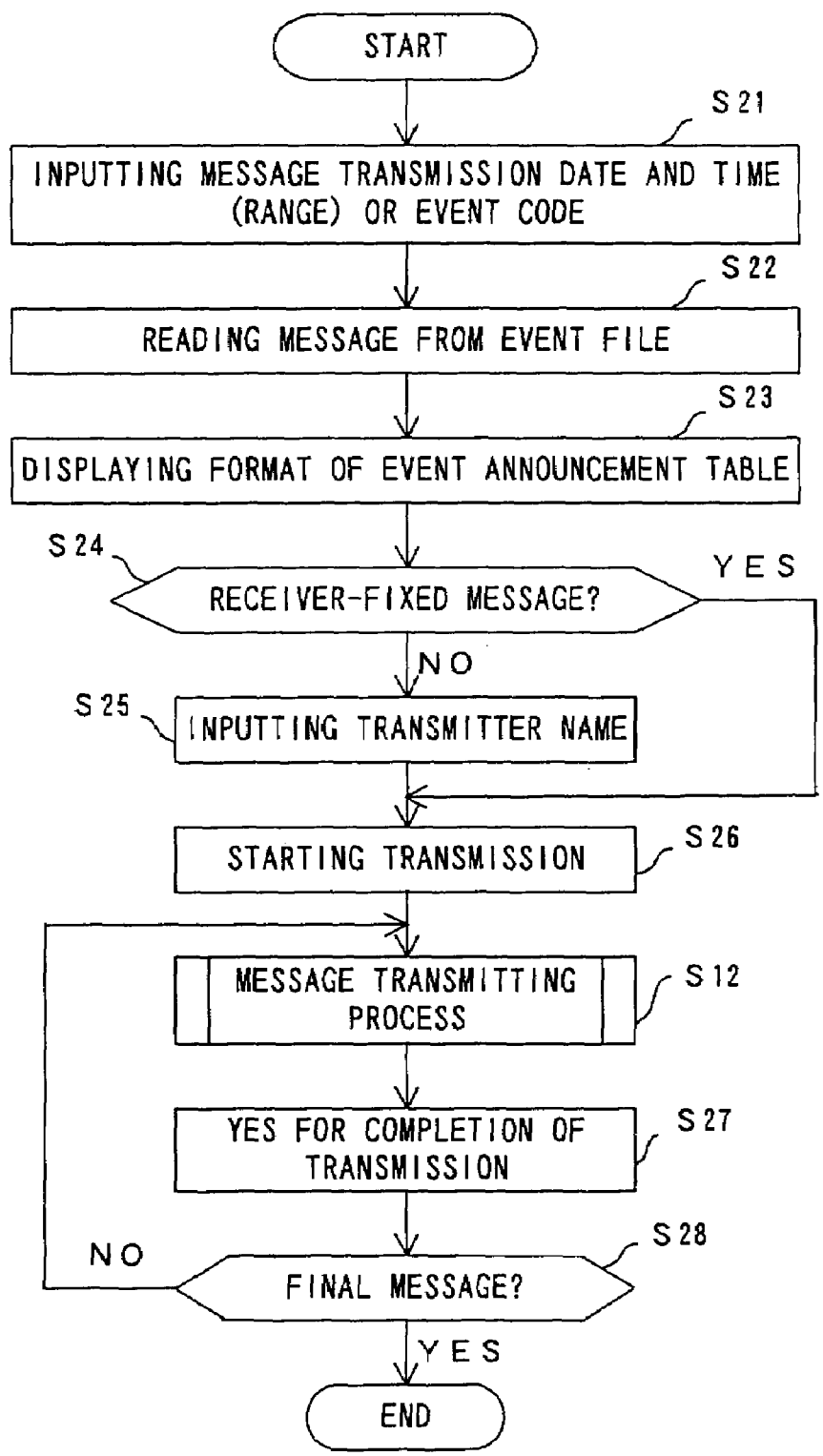
F I G. 8

| EVENT CODE | 1 LEVEL | 2 LEVEL | 3 LEVEL | MESSAGE ID | TITLE |
|---|---|---|---|---|---|
| | | | | | |
| 210918 | □□ OPERATION | ▲▲GENERATION UPDATE | ○○MATERIAL | 000003 | ●●MEETING |
| 210919 | | | ×○PROCESSED | 000020 | □△CHANGED |
| 834701 | ●△ CONFERENCE RESEARCH | ×× ACTUAL RESULT | △△GENERATED | 000036 | ●△CONFERENCE RELATING TO |

| | CONTENTS | PLANNED DATE OF TRANSMISSION | COMPLETION OF TRANSMISSION |
|---|---|---|---|
| | | | |
| | GENERATING PRELIMINARY MATERIAL····· | 1999/02/03 | ■YES |
| | CHECKING METHOD IS ······ | 1999/03/15 | □ |
| | SCHEDULE IS ···· | 1999/04/02 | □ |

FIG. 9

| CODE | CONTENTS |
|---|---|
| 1 | ALL RECEIVERS OPENED MESSAGE WITH TERM |
| 2 | OPENING RATE OF MESSAGE WITH TERM EXCEEDED PREDETERMINED THRESHOLD |
| 3 | ALL RECEIVERS COMPLETED MESSAGE WITH TERM |
| 4 | COMPLETION RATE OF MESSAGE WITH TERM EXCEEDED PREDETERMINED THRESHOLD |
| 5 | TERM OF MESSAGE WITH TERM EXPIRED |

F I G. 1 1

| OPENING | COMPLETION | TITLE | TRANSMITTER | TRANSMISSION DATE AND TIME | OPENING DATE AND TIME | TERM | COMPLETION DATE OF USER | ENTIRE COMPLETION | EFFECTIVE TERM | CONFIDENTIAL MESSAGE | DELETION |
|---|---|---|---|---|---|---|---|---|---|---|---|
| 1/1 (0%) | 0/1 (0%) | COMMENT ON 'COMMENT TEST' | 森 俊樹 | 1999/04/19 19:25:45 | 1999/04/19 19:26:04 | | | | | | |
| 0/14 (0%) | 0/14 (0%) | ABOUT●● | 天気晴朗 | 1999/02/15 13:30:15 | | 1999/03/03 | | | | | DELETION ONLY BY TRANSMITTER |
| 5/20 (25%) | 3/20 (15%) | REQUEST FOR △△ | 山紫水明 | 1999/02/17 08:05:23 | 1999/02/20 10:55:19 | 1999/03/05 | 1999/02/25 | | | | DELETION ONLY BY TRANSMITTER |
| 5/5 (100%) | 3/5 (100%) | PROCESS OF ◇◇ | 晴天霹靂 | 1999/02/17 09:00:00 | 1999/02/17 11:14:23 | 1999/02/18 | 1999/02/17 17:00:40 | 1999/02/17 20:03:45 | | | |
| 12/40 (33%) | 3/40 (8%) | IHANDLING ×× | 難波歌留多 | 1999/02/17 18:45:36 | 1999/02/18 9:00:00 | | 1999/02/20 12:05:38 | | 1999/02/20 | AUTOMATIC DELETION AT COMPLETION BY RECEIVERS | CAN BE DELETED BY RECEIVER |
| 1/1 (100%) | 0/1 (0%) | INFORMATION ABOUT ○○ | 岡目清子 | 1999/02/19 09:30:05 | 1999/02/20 10:59:20 | 1999/03/15 | | | | | DELETION ONLY BY TRANSMITTER |
| 56/278 (20%) | 43/278 (15%) | ABOUT△△ | 有象無象 | 1999/02/19 10:50:20 | 1999/02/20 12:20:56 | | 1999/02/28 20:06:26 | | | | AUTOMATIC DELETION AT COMPLETION BY ALL RECEIVERS |
| 18/18 (100%) | 18/18 (100%) | RELATING TO METHOD OF○○ | 二宮来光 | 1999/03/10 15:00:00 | 1999/03/15 10:00:00 | 1999/03/20 | 1999/03/15 10:03:40 | 1999/03/16 13:00:38 | | | |

FIG. 13

| TYPE | COMMENT ☐←COMPLETION CHECK | | | CONFIRMATION | |
|---|---|---|---|---|---|
| COMMENT | | | | | |
| TRANSMIS-SION DATE | 99/04/19 19:25:45 (DISPLAY STARTING DATE:99/04/19 19:25:46) | | | | |
| TITLE | COMMENT ON 'COMMENT TEST' | | | | |
| TEXT | TEXT<br>ENTER COMMENT AND PRESS COMPLETION KEY<br>COMMENT STATE ON MESSAGE<br>(TRANSMITTER IS AUTOMATICALLY INFORMED AT COMPLETION OF COMMENT REQUIRED MESSAGE) | | | | |
| | NAME | OPENING DATE | STATE | COMPLETION | COMMENT |
| | 森 俊樹 | 99/04/19 | COMPLE-TION | 99/04/19 | TEST |
| | 鈴木 一大 | 99/04/19 | COMPLE-TION | 99/04/19 | APPROVED |
| | 川嵜 久則 | 99/04/19 | COMPLE-TION | 99/04/19 | TEST |
| TRANSMIT-TER NAME | 森 俊樹 | RETURN | TRANS-FER | TRANSMITTING TEXT | |
| CABINET STORED | COPIED TO | PROCEEDINGS OF EDUCATIONAL SYSTEM DEPARTMENT | ▼ | STORAGE ☐ADDING CURRENT OPENING STATE | |
| STATE NOT OPENED | OPENING : 1/1 (100%) COMPLETION CHECK : 0/1 (0%) | | | | |
| NAME | OPENING DATE | STATE | COMPLETION DATE | COMMENT | |
| 森 俊樹 | 1999/04/19<br>19:26:04 | | | | |

F I G. 1 4

| STATUS | TITLE | TRANSMISSION DATE AND TIME | TERM | DELETION |
|---|---|---|---|---|
| OPENED BY ALL RECEIVERS | ABOUT△△ | 1999/02/10 11:14:07 | 1999/03/25 | ☐ |
| 70% OPENED | INFORMATION ABOUT ×× | 1999/02/17 10:30:43 | 1999/03/10 | ☐ |
| COMPLETED BY ALL RECEIVERS | REQUEST FOR ○○ | 1999/02/04 11:04:30 | 1999/02/15 | ☐ |
| | HANDLING ●● | 1999/02/10 08:04:19 | 1999/02/20 | ☐ |
| 90% COMPLETED | ABOUT GENERATION OF ▲▲ | 1999/01/24 12:00:06 | 1999/02/03 | ☐ |
| EXPIRATION OF TERM | COMMENT ON 'COMMENT TEST' | 1999/04/19 19:25:45 | 1999/04/25 | ☐ |

DELETION OK ☐

| TYPE | COMMENT ☐ ← COMPLETION CHECK    CONFIRMATION | | | | |
|---|---|---|---|---|---|
| COMMENT | | | | | |
| TRANSMISSION DATE | 99/04/19 19:25:45   (DISPLAY STARTING DATE:99/04/19 19:25:46) | | | | |
| TITLE | COMMENT ON 'COMMENT TEST' | | | | |
| TEXT | TEST<br>ENTER COMMENT AND PRESS COMPLETION KEY | | | | |
| | COMMENT STATE ON MESSAGE | | | | |
| | NAME | OPENING DATE | STATE | COMPLETION DATE | COMMENT |
| | 森 俊樹 | 99/04/19 | COMPLETION | 99/04/19 | TEST |
| | 鈴木 一大 | 99/04/19 | COMPLETION | 99/04/19 | APPROVED |
| | 川嵜 久則 | 99/04/19 | COMPLETION | 99/04/19 | TEST |
| TRANSMITTER NAME | 森 俊樹   RETURN   TRANSFER   TRANSMITTING TEXT | | | | |
| STORED | COPIED TO | PROCEEDINGS OF EDUCATIONAL SYSTEM DEPARTMENT ▼ | STORAGE | ☐ADDING CURRENT OPENING STATE | |
| STATE NOT OPENED | OPENING : 1/1 (100%)   COMPLETION CHECK : 0/1 (0%) | | | | |
| | NAME | OPENING DATE | STATE | COMPLETION DATE | COMMENT |
| | 森 俊樹 | 1999/04/19 19:26:04 | | | |

F I G.  1 5

| TITLE | RECEIVER | TERM SPECIFIED BY TRANSMITTER | OFFERED TERM | | AFTER ADJUSTMENT |
|---|---|---|---|---|---|
| ABOUT ○○ | 天気晴朗 | 1999/02/20 | 1999/03/20 | APPROVED ☐ REJECTED ☐ | 1999/04/14 |
| PROCESS OF □△ | 波間はるか | 1999/03/30 | 1999/03/15 | APPROVED ☐ REJECTED ☐ | |
| | 青空澄夫 | | 1999/04/10 | APPROVED ■ REJECTED ☐ | |

F I G. 1 7

MESSAGE PROCESSING APPARATUS, MESSAGE PROCESSING SYSTEM, MESSAGE MANAGING METHOD, AND STORAGE MEDIUM STORING MESSAGE MANAGEMENT PROGRAM

BACKGROUND OF THE INVENTION

1. Field of the Invention

The present invention relates to a message processing apparatus, a message processing system, a message managing method, and a storage medium storing a message management program for processing a message

2. Description of the Related Art

When work is performed through cooperation among a number members, it is necessary for a leader of a group to receive a report of the process of a job assigned to each member so that the leader can be well informed of the processes of the respective jobs assigned to the members of the group. Therefore, the leader has to communicate messages with the members through electronic mail, etc. as follows.

First, the leader generates a message inquiring the process of a job, and transmits it to all members. Upon receipt of the message, each member generates a message reporting whether or not his or her job has been completed, and transmits it to the leader. The leader reads the messages from all the members, and determines the entire process of the work of the group.

SUMMARY OF THE INVENTION

As described above, in a method in which the leader transmits a message inquiring the process of the job assigned to each member, and each member returns a message reporting whether or not his or her job has been completed, the leader has to read messages of all members of the group. As a result, there has been the problem that the larger the number of members is, the heavier the load on the leader becomes.

In addition, each member normally belongs to a plurality of groups, and each group leader specifies the term of a job assigned to each member. Therefore, a member may have a plurality of jobs whose terms fall at the same date or are close to each other. As a result, a member may not be able to honor his or her term. In this case, the member generates a message requesting a change of the term, and transmits it to the leader to obtain permission, thereby requiring troublesome procedure for a term change. On the other hand, a leader cannot be informed whether or not his or her members request to change their terms until the leader receives and reads a message from each member. Therefore, the larger the number of members is, the heavier load the leader is burdened with as in the case of receiving reports of the process of jobs as described above.

Furthermore, the information as to whether or not a received message is confidential is displayed. However, since a confidential message can be transferred, it can be mistakenly transferred to a wrong member.

In addition, if there are a large number of message to be communicated, then a user cannot easily read each message because the titles of already read messages are displayed on a message list, and the processing speed becomes lower with a number of unnecessary messages stored in the memory.

The present invention aims at allowing a transmitter or a receiver of a message to confirm the information indicating the opening state of a message, the information indicating the completion state of the job of the receiver of the message, or the information indicating the expiration of the term of a job. Another object of the present invention is to allow a transmitter of a message to be collectively informed of the requested terms of all receivers of the message. A further object of the present invention is to avoid mistakenly transferring a confidential message. A further object of the present invention is to easily generate a message relating to an event whose date and members involved have been already planned.

The present invention includes: an acquisition unit for obtaining information indicating the opening state of a message, information indicating the completion state of the job of the receiver of the message, or information indicating the expiration of the term of a job specified by the message; and a control unit for causing a terminal device to forcibly display the information indicating the opening state of a message, the information indicating the completion state of the job of the receiver of the message, or the information indicating the expiration of the term of a job specified by the message.

According to the present invention, the information indicating the opening state of a message, the information indicating the completion state of the job of the receiver of the message, or the information indicating the expiration of the term of a job can be forcibly displayed on the terminal device when the transmitter of the message requests to display the information, or when a predetermined condition is satisfied. Therefore, the transmitter or the receiver of the message can be informed of the information indicating the opening state of a message, the information indicating the completion state of the job of the receiver of the message, etc.

For example, if it is designed that information indicating the completion state of a job is displayed when the number of members who have completed message-related jobs exceeds a predetermined value, then the completion state the jobs of all message receivers can be simultaneously grasped when the number of members who have completed their jobs exceeds the predetermined value.

The present invention further includes a message generation unit for generating a message provided with a confirmation button for notifying from a message receiver to a message transmitter that the receiver has completed his or her job. When the message receiver presses the confirmation button, the control unit determines that the receiver has completed his or her job, obtains the number of receivers who have pressed the confirmation button, and, when the number of the receivers who have completed their jobs exceeds a predetermined value, or when all receivers have completed their jobs, allows the information indicating the completion state to be displayed on the terminal device.

According to the present invention, in addition to the above described effect, a message receiver can inform the message transmitter that his or her job has been completed only by pressing the confirmation button of the message.

In addition, the message generation unit can be designed to generate a message including an input column for an offered term requested by a receiver, and the control unit can be designed to allow the offered term input into the input column in the message by the message receiver to be displayed on the terminal device of the transmitter.

According to the present invention, since a receiver can inform the transmitter of his or her offered term only by inputting a desired term into the offered term input column of the message, the receiver does not have to generate a message requesting a term change. In addition, the transmitter of the message does not have to read a message requesting a term change to be received from each member, but can collectively grasp the offered terms of a plurality of members, thereby efficiently approving the offered term of each member, or efficiently adjusting the term of the entire work.

The present invention can also be designed such that information limiting transfer can be set in a message, and the control unit can limit the transfer of a confidential message in which the information limiting the transfer is set.

Thus, even when a user of a terminal device specifies the transfer of a confidential message, the confidential message can be prevented from being mistakenly transferred to a wrong member because the transfer of a message is limited if the information indicating a confidential message is set.

BRIEF DESCRIPTION OF THE DRAWINGS

FIG. 1 shows the configuration of a message processing system;

FIG. 3 shows the contents of a confidential level;

FIG. 4 shows the contents of a deletion code;

FIG. 5 shows the configurations of an event file and a receiving member file;

FIG. 7 is a message transmission table;

FIG. 8 is a flowchart of the message developing and transmitting process;

FIG. 9 is an event announcement table;

FIG. 11 shows the contents of a completion status;

FIG. 13 shows a list of received messages;

FIG. 14 is a completion state table (message-included);

FIG. 15 is a completion state table (list);

FIG. 17 is an offered term list; and

DESCRIPTION OF THE PREFERRED EMBODIMENTS

Figure 2:
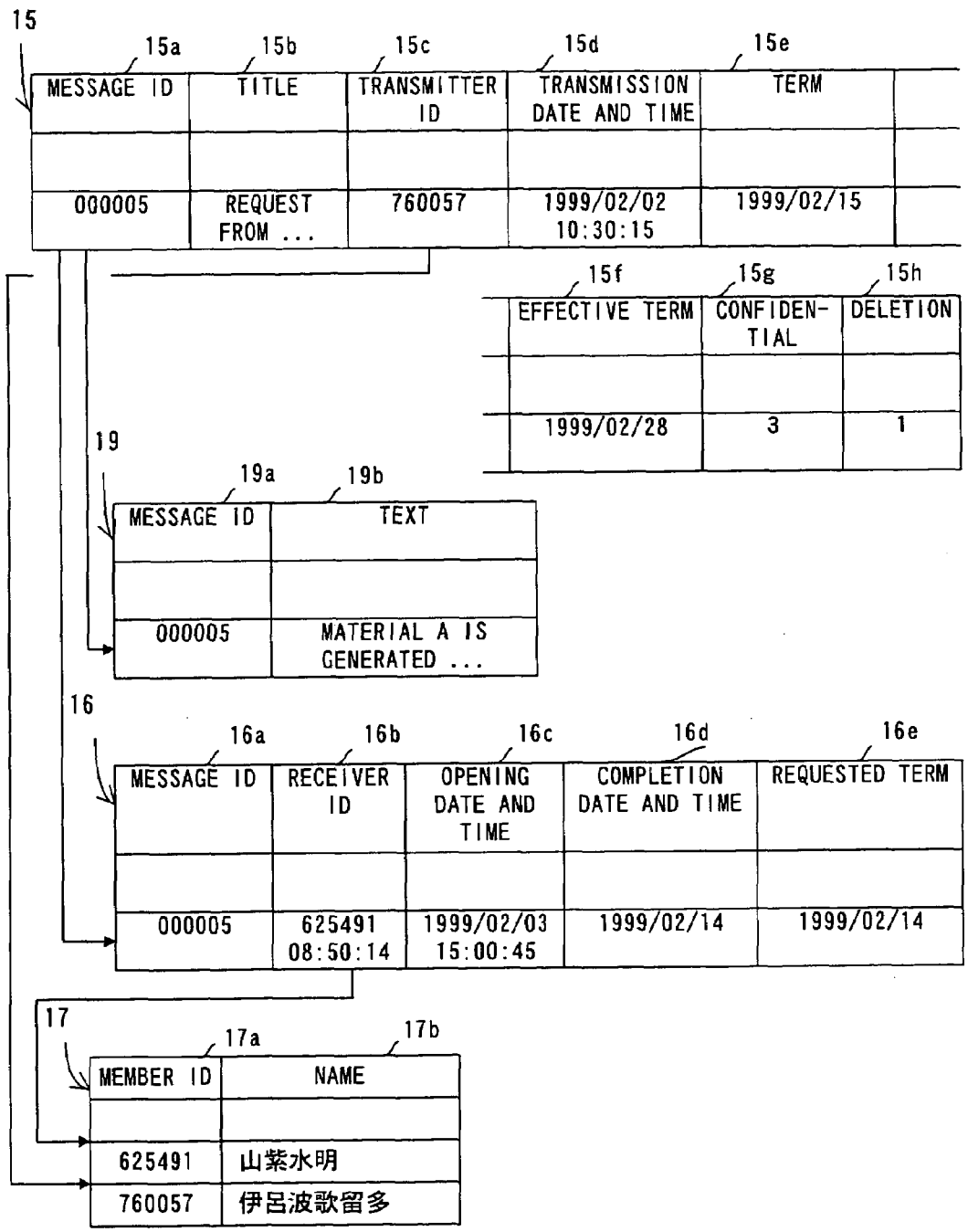
FIG. 2 shows the configurations of a message file, a message state file, and a member file.

The embodiment of the present invention is described below by referring to the attached drawings. FIG. 1 shows the configuration of the message processing system according to the present invention.

The message processing system comprises a plurality of terminal devices 11 connected to a message processing apparatus (server apparatus) 13 through a communications line 12 such as a wireless, satellite communications, a public circuit network, a LAN, etc. The storage device of the message processing apparatus 13 stores a message management program 14 and various files. The message management program 14 has the function of generating and transmitting a message in the terminal device 11, and the function of displaying a received message list, an transmitted message list, a completion state table, the contents of a message, etc.

A message file 15 is a file storing information about a transmitter of a message, and stores, for example, a message ID, the title of a message, a transmitter ID, etc. A message state file 16 is a file storing information of a receiver of a message, and stores, for example, a message ID, a receiver ID, an opening date and time, etc. A member file 17 stores the ID and the name of a member entered as the destination of the message. An event file 18 stores information about an event such as a conference, etc. whose date and members involved have been already planned.

First, the configurations of the message file 15, the message state file 16, and the member file 17 are described below by referring to FIG. 2.

The message file 15 comprises: an area 15a storing a message ID assigned to each message; an area 15b storing the title of a message; an area 15c storing a transmitter ID; an area 15d storing a transmission date and time; an area 15e storing a term of a job, etc.; an area 15f storing the effective term of a message; an area 15g storing the confidential level of a confidential message; and an area 15h storing the deletion information about a message.

Three confidential levels 1 through 3 shown in FIG. 3 can be set in the area 15g storing the confidential level of a confidential message. For example, when the confidential level 1 is set in the area 15g, the transfer of a message is limited, and the message cannot be transferred to another terminal device even if a user specifies the transfer. In addition, when the confidential level 2 is set, a warning message is displayed when a corresponding message is transferred to notify the user that the message is a confidential message. When the confidential level 3 is set, the characters 'confidential' are displayed as emphasized beside the title, or the title is displayed in color different from the colors of other messages to inform the user that the message is a confidential message.

In addition, four deletion codes 1 through 4 shown in FIG. 4 can be set in the area 15h storing the deletion information. For example, when 1 is set in the area 15h storing a deletion code, and a job associated with the message is completed by all members, the message is automatically deleted. If 2 is set in the area 15h as the deletion code, and all members have completed the reception, the message is automatically deleted. When the deletion code of 3 is set in the area 15h, the transmitter or the receiver can delete the message. Furthermore, when the deletion code of 4 is set in the area 15h, only the transmitter can delete the message.

Back in FIG. 2, the message state file 16 comprises: an area 16a storing a message ID; an area 16b storing a receiver ID; an area 16c storing a message opening date; an area 16d storing the completion date of a job relating to the message; and an area 16e storing the term (offered term) requested by a receiver.

The member file 17 comprises an area 17a storing a member ID and an area 17b storing the name of the member.

In addition, a message text file 19 storing message text is provided. The message text file 19 comprises an area 19a storing a message ID and an area 19b storing message text.

The configurations of the event file 18 and a receiving member file 20 are described below by referring to FIG. 5.

The event file 18 stores information about a message informing of a periodic or a non-periodic event such as a conference, etc., and comprises: an area 18a storing an event code assigned for each event; areas 18b through 18d storing three levels of events; an area 18e storing a message ID; an area 18f storing the title of the message; an area 18g storing the contents of the message; an area 18h storing a planned transmission date; and an area 18i storing information indicating whether or not the message has been transmitted.

A level of an event indicates the contents of the event shown in FIG. 5. That is, a level 1 indicates the contents of an event, a level 2 indicates the furthermore detailed contents than the level 1, and a level 3 indicates the furthermore detailed contents than the level 2. That is, data obtained by designing events in a hierarchical structure is set with a level. For example, when a conference of a specific department is periodically held for each subject, the subject of the conference of the department, the month in which a conference is held, and members are set in the event file 18 as hierarchical event levels thereby displaying an event announcement table 91 (FIG. 9) showing a plurality of events described later based on event file 18, and easily generating an event announcement message, etc. by a transmitter according to the event announcement table 91.

The receiving member file 20 shown in FIG. 5 comprises an area 20a storing an event code, and an area 20b storing a member ID, and contains a subscriber member of an event set in the file.

Figure 6:
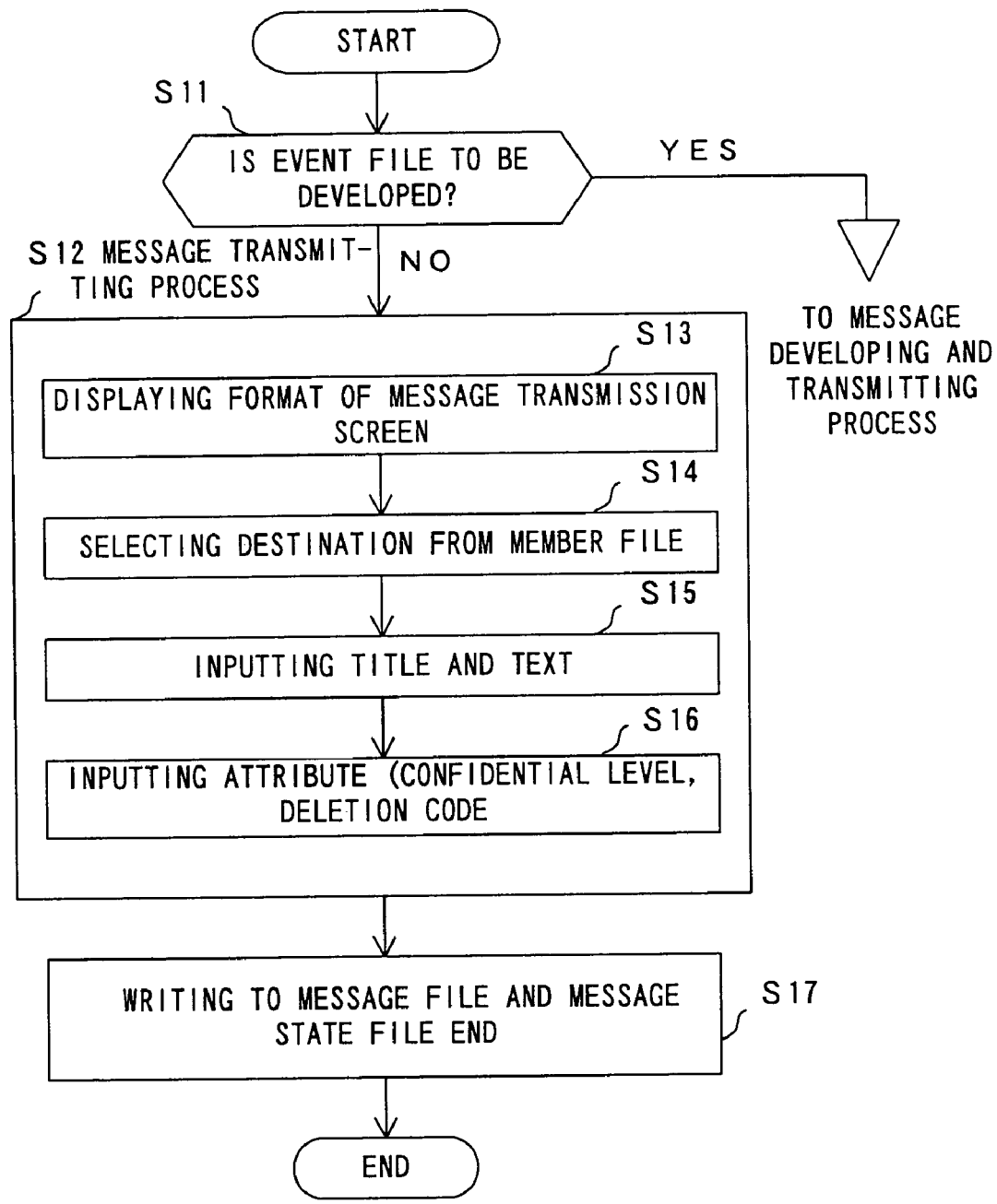
FIG. 6 is a flowchart of an individual message transmitting process.

Described below are the operations of the message processing apparatus 13 with the above described configuration. FIG. 6 is a flowchart of the individual message transmitting process.

First, it is determined whether or not a message is to be generated by developing the event file 18 (S11 in FIG. 6). If the event file 18 is not developed (NO in S11), then the message transmitting process in step S12 is performed. In the message transmitting process in step S12, the format of a message transmission screen is first displayed (S13). Then, a destination is selected from the member file 17 (S14). In addition, the title and the text of a message are entered (S15), and the deletion code and the confidential level are entered (S16). The deletion code and the confidential level respectively indicate any of the four types of deletion codes shown in FIG. 4, and any of the three types of confidential levels shown in FIG. 3. By setting the codes, a message can be automatically deleted, restricted for transfer, etc. as a confidential message.

FIG. 7 shows an example of a message transmission list generated on the message transmission screen. In the example shown in FIG. 7, two destinations are selected from the member file 17, the titles and text are input, and 99/02/24 is set as a term.

In the column indicating whether or not the message is a confidential message, a check box is displayed to the right of each of the character string 'no transfer function' indicating that no messages can be transferred, the character string 'transfer suppression' indicating a confidential message on the screen when a transferring operation is performed, and the character string 'emphasized display' indicating an emphasized display of a title such that a confidential message can be recognized from other messages. By clicking a mouse, etc. at any of the check boxes, a confidential level can be set.

In addition, in the column in which a deletion condition is set, a check box is similarly displayed to the right of each of the character strings 'deleted at completion by all members', 'deleted by a receiver', 'deleted only by a transmitter' so that each condition can be set by clicking a mouse at any of the check boxes. For example, when 'deleted at completion by all members' is set as a deletion condition, the message is automatically deleted when the completion rate reaches 100%. When 'deleted by a receiver' is set as a deletion condition, the message can be deleted by a receiver of the message. In the example shown in FIG. 7, 'deleted only by a transmitter' is set as a deletion condition.

Furthermore, the display of a completion state table showing the completion state of the job of a receiver, and the display of an offered term table showing the offered term of each of the receivers can be specified by a transmission message. In the example shown in FIG. 7, the display of the completion state table is specified. Simultaneously, both completion state table and offered term table can be displayed by clicking the mouse at the check box to the right of the 'offered term table'.

Back in FIG. 6, when the message transmitting process is completed, the information relating to the message transmitted to the message file 15 and the message state file 16 is written, that is, the information input to the message transmission table is written to the files (S16).

When the development of the event file 18 is selected in step S11 shown in FIG. 6, control is passed to step S21 shown in FIG. 8, and a message transmission date and time or an event code is input. When the transmission date and time or the event code is input, the event information specified by the information is read from the event file 18 (S22), and the event announcement table 91 is generated and displayed (S23).

FIG. 9 shows the event announcement table 91. In the event announcement table 91, an event with the date specified by the transmitter, an event in the range of the specified date, or an event having one or more specified event codes is displayed. The transmitter can easily generate a transmission message relating to an event by selecting the event displayed on the event announcement table 91. The example shown in FIG. 9 shows the contents of the event announcement table 91 obtained when three event codes are specified.

Then, it is determined whether or not the message displayed in the event announcement table 91 is a message for a fixed receiver, that is, whether or not the message is to be transmitted to a predetermined receiver (S24). If the message is not a message for a fixed receiver, then control is passed to step S25, and the name of the receiver is input.

When the name of a receiver is input, then the transmission of a message is specified for the receiver. If a message is to be transmitted to a fixed receiver, then the transmission of a message is specified for a predetermined receiver (S26). When the transmission of a message is specified, the above described message transmitting process in S12 is performed, the title, the destination, the text, etc. displayed in the event announcement table 91 are fetched on the message transmission screen, and the message is transmitted. When the transmission of the message is completed, the information indicating whether or not the corresponding message in the event announcement table 91 has been transmitted is changed into the transmission completion information (S27). Then, it is determined whether or not there are messages to be generated. If yes, control is returned to step S12, the message transmitting process is performed, and the process terminates if there are no more messages.

The completion status notifying process for displaying the completion state table on the transmitter's terminal device is described below by referring to the flowchart shown in FIG. 10.

Figure 10:
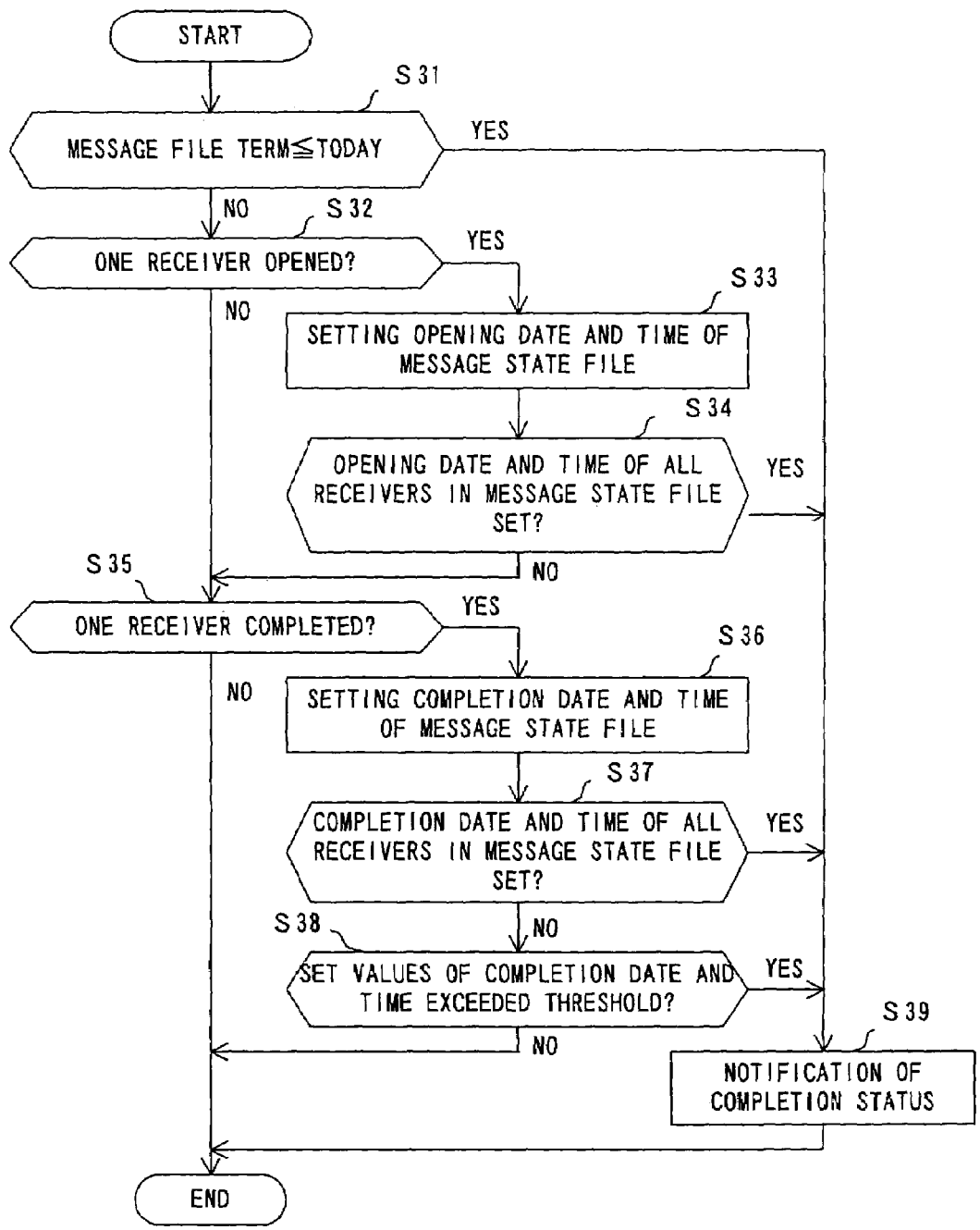
FIG. 10 is a flowchart of the completion status notifying process.

First, it is determined whether or not the term of the message in the message file 15 refers to today or before, that is, the specified term has already expired (S31 shown in FIG. 10). If yes (YES in step S31), then control is passed to step S39, and the completion status indicating the expiration of the term is issued.

Five types of codes shown in FIG. 11 are predetermined as completion statuses. Code 1 indicates that the message is opened by all receivers. Code 2 indicates that the opening rate of the message has exceeded a predetermined threshold. Code 3 indicates that the job associated with the message has been completed by all receivers. Code 4 indicates that the completion rate of the job associated with the message has exceeded a predetermined threshold. Code 5 indicates that the term specified by the message has expired.

If the term specified by the message has not expired yet (NO in S32), then it is determined whether or not any receiver has opened the message, that is, whether or not there is a receiver who has newly opened the message (S32). If yes (YES in S32), then control is passed to step S33, and the current date and time are set in the area 16c storing the opening date and time of the receiver ID of the corresponding message ID in the message state file 16. Then, the opening date and time of other receivers corresponding to the same message ID in the message state file 16 are checked, and it is determined whether or not the opening date and time of all receivers are set, that is, whether or not all receivers have opened the message (S34).

If the opening date and time of all receivers have been set (YES in S34), then control is passed to step S39, and a corresponding completion status is issued. In this example, since all receivers have opened the message, the completion status code 1 shown in FIG. 11 is issued as a completion status. A completion status can be issued when the opening rate exceeds a predetermined threshold in step S39.

If it is determined in step S32 shown in FIG. 10 that the message has not been opened (NO in S32), or if the determination in step S34 is NO, then control is passed to step S35, and it is determined whether or not any receiver has completed the job, that is, whether or not there is a receiver who has newly pressed the confirmation button.

If there is a receiver who has completed the job (YES in S35), then the current date and time are set in the area 16*d* storing the completion date and time of a receiver corresponding to the message of the message state file 16. Then, it is checked whether or not the completion date and time of other receivers of the message of the message state file 16 are set, and is then determined whether or not the completion date and time of all receivers have been set (S37).

If it is determined that the completion date and time of all receivers are set (YES in S37), then control is passed to the above described step S39, and a corresponding completion status, that is, the completion status code 3 indicating all receivers have completed their jobs is issued.

If the determination in step S37 is NO, that is, if there is a receiver who has not completed his or her job, then it is determined whether or not the number of receivers whose completion date and time are set exceeds a predetermined threshold (S38).

When the number of receivers whose completion date and time are set, that is, the number of receivers who have completed their jobs exceeds a predetermined threshold (YES in S38), control is passed to step S39, and the corresponding completion status, that is, the completion status code 4 in this example indicating that the completion rate has exceeded a predetermined threshold is issued.

The process of displaying a completion state table is described below by referring to the flowchart shown in FIG. 12.

Figure 12:
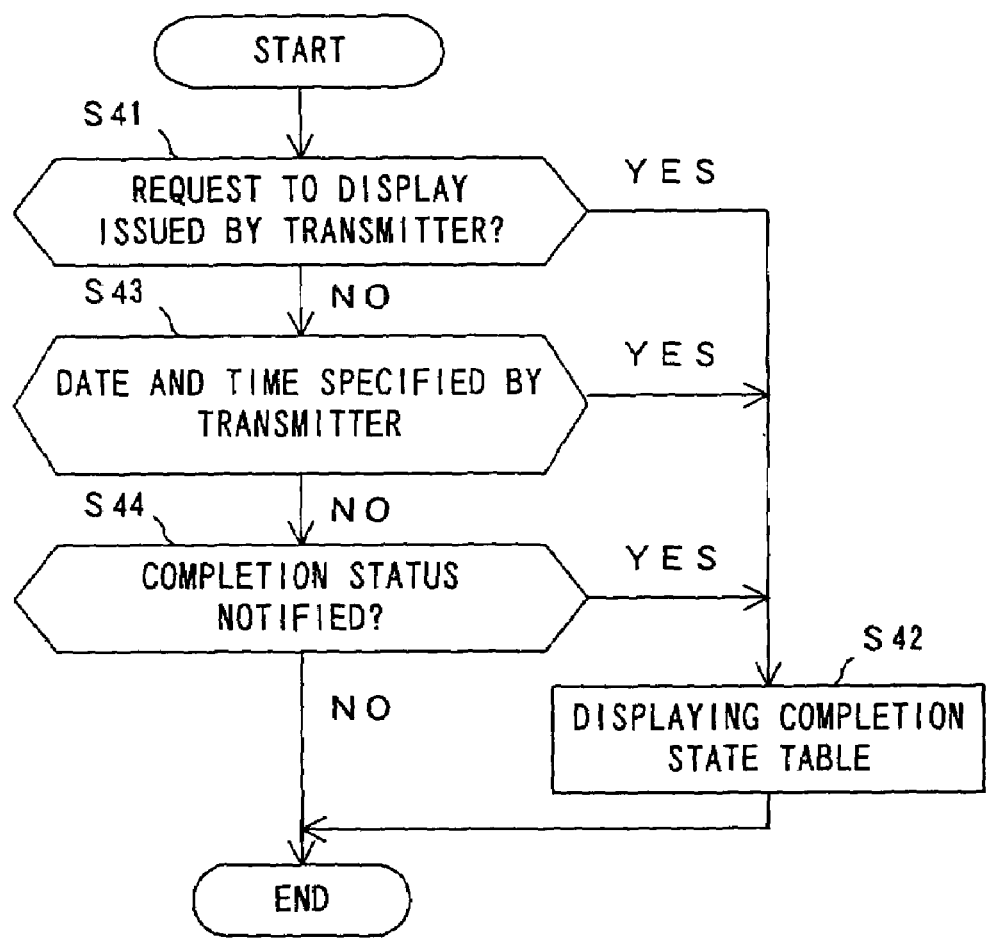
FIG. 12 is a flowchart of a completion state table.

First, it is determined whether or not a transmitter has issued a completion state table display request (S41 shown in FIG. 12). If yes (YES in S41), control is passed to step S42, and the completion state table is displayed.

If there is no display request from a transmitter (NO in S41), then control is passed to step S43, and it is determined whether or not the date and time specified by the transmitter have been reached. If the current date and time match the date and time specified by the transmitter (YES in S43), then control is passed to the above described step S42, and the completion state table is displayed.

If the current date and time do not match the date and time specified by the transmitter (NO in S43), then control is passed to step S44, and it is determined whether or not the completion status has been issued. If a completion status has been issued (YES in S44), then control is passed to step S42, and the completion state is displayed.

The completion state table (containing the received message list) forcibly displayed on the transmitter's terminal device when the current date and time match the date and time specified by the transmitter, or when the completion status is issued is described below by referring to FIGS. 13 through 15.

FIG. 13 shows a received message list 131 of the messages forcibly displayed on the transmitter's terminal device when the current date and time match the date and time specified by the transmitter, or when the completion status is issued.

When the completion status is issued, the message transmitted by the user is displayed as a received message in the received message list 131 of the transmitter of the message whose completion status has been issued.

The received message list 131 displays the number of receivers who have opened the message in the total number of receivers corresponding to the title of the message, the message opening rate, the number of receivers who have completed their jobs in the total number receivers, and the completion rate. Then, the transmitter or the receiver can be informed of the ratio of the receivers who have opened the message to all receivers, and how many receivers have completed their jobs according to the above described information. In addition, the comment of a receiver in response to the received message, for example, the offered term, etc. of each receiver can be displayed by clicking a mouse, etc. at the title of the message.

In the example shown in FIG. 13, when a transmitter opens the message 'comment on the test of a comment' transmitted to himself or herself, then the opening rate is 100%. Therefore, a completion status is immediately issued, and the title of the message 'comment on the test of a comment' is displayed at the start of the received message list 131. Therefore, the transmitter can be informed of the opening state of the message, or the completion state of the entire work associated with the message according to the displayed information without completely reading the message.

FIG. 14 shows the display state when obtained when the transmitted message (completion state table) displayed on the received message list 131 shown in FIG. 13 and addressed to the user is opened.

The type column at the top of the message is provided with a confirmation button. When a receiver completes his or her job, he or she presses the button, and the message processing apparatus 13 determines that the receiver has completed his or her job.

When a message is displayed, a receiver state table containing the text of the message followed below by the names, the opening date and time, the completion or non-completion, the completion date, and the comment of all receivers. According to the receiver state table, the opening state, the completion state, the comment, etc. of each receiver can be obtained.

In the example shown FIG. 14, since the transmission message is addressed to the user, the receiver state table displayed with and below the message contains only the name '森俊樹'. However, when there are a plurality of receivers, the information containing the opening date and time, the completion state, the completion date and time, and the comment, etc. of all receivers are displayed. Then, by displaying the offered term of each receiver on the receiver state table, the offered terms of the plurality of receivers can be collectively confirmed. The offered term of a receiver can be displayed in the comment column of the receiver state table, can be displayed after generating an offered term table 171 described later, or can be displayed in any other formats.

FIG. 15 shows a completion state table 151 displayed as a list of transmission messages in which a completion state status is set.

The completion state table 151 is forcibly displayed on the transmitter's or the receiver's terminal device when the user of a terminal device issues a display request, when a predetermined condition is satisfied, for example, when the user-set date and time have been reached, and when the information indicating an opening state, the information indicating a completion state, or the information indicating the expiration of the term has satisfied a predetermined condition.

Since the completion state table 151 displays with the title of the message the information indicating that an opening rate has exceeded a predetermined value, all receivers have opened the message, the completion rate has exceeded a predetermined value, all receivers have completed their jobs, or the term has inspired, the transmitter can be informed at a proper timing as to how many receivers have opened the message, and how many receivers have completed their jobs, etc. without reading the message reporting the completion state, etc. transmitted from each receiver. Thus, the leader who has transmitted the message can efficiently grasp the process of the entire work, and therefore, a large number of members can be managed with the load of the leader considerably reduced.

The process of a receiver requesting a change in the term specified by a message is described below by referring to FIG. 16.

Figure 16:
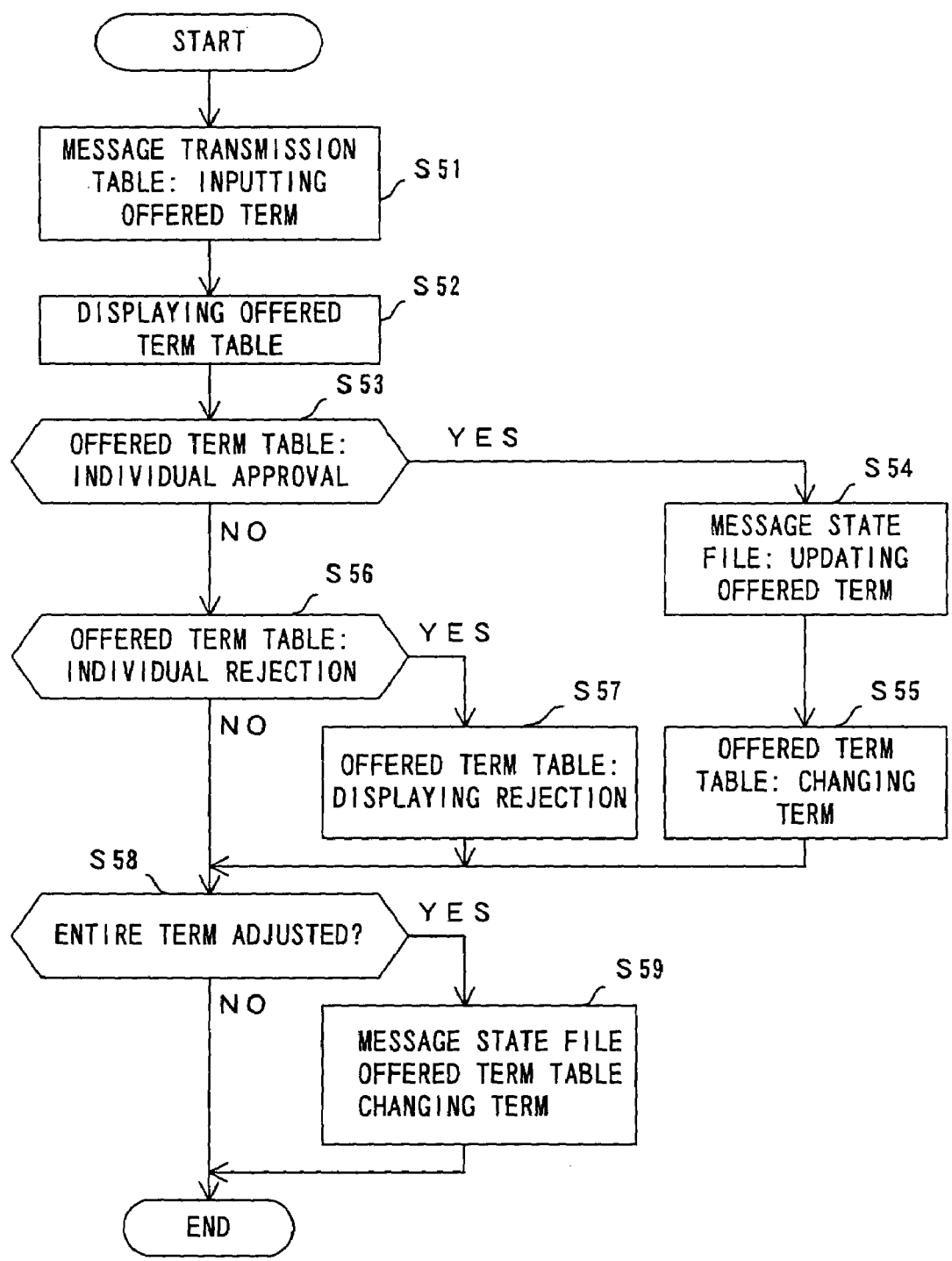
FIG. 16 is a flowchart of the process corresponding to offered terms.

When a receiver receives a message with a term, and requests a change in a specified term, the receiver inputs an offered term (S51 shown in FIG. 16). When the offered term is input into the input column of an offered term of a received message, the offered term table 171 as shown in FIG. 17 is generated, and the offered term table 171 is displayed on the terminal device of the transmitter.

The offered term table 171 comprises columns of the title of a message, the name of a receiver, the term specified by the transmitter, the offered term of a receiver, an approval or rejection of the transmitter for the offer, and the term after the adjustment as shown in FIG. 17.

When the offered term table 171 is displayed, the transmitter determines whether or not the term can be changed according to the term requested by the receiver, the work schedule, etc., and individually issues an approval or a rejection of the offered term. Then, in step S53, it is determined whether or not the transmitter has approved an individual offered term of a receiver.

When the offered term of a receiver is approved (YES in S53), control is passed to step S54, and the offered term of the corresponding receiver in the message state file 16 is updated. In addition, the term of the receiver corresponding to the offered term table 171 is changed (S55). If the requested individual term of the receiver has been approved, then, the check box to the right of 'approved' of the offered term table 171 shown in FIG. 17 turns from white into black, thereby explicitly indicating that the offered term of the receiver has been approved.

When an individual offered term of a receiver is not approved (NO in S53), control is passed to step S56, and it is determined whether or not the offered term is to be rejected. If the individual offered term has been rejected (YES in S56), then control is passed to step S57, and the square check box to the right of the characters 'rejected' of the corresponding receiver in the offered term table 171 turns from white into black, thereby indicating that the offered term has not been approved.

If an individual offered term of a receiver is not approved or rejected (NO in S56), control is passed to step S58, and it is determined whether or not the entire term has been adjusted. If yes (YES in S58), control is passed to step S59, and the offered term in the message state file 16 is changed into the adjusted term, and the adjusted term is written to the column of the adjusted term in the offered term table 171.

According to the above described embodiment of the present invention, since the information indicating the opening state of a message, the information indicating the completion state, or the information indicating the expiration of the term of the receiver of the message is forcibly displayed on the terminal device of the transmitter when the transmitter or the receiver issues a display request or when the information satisfies a predetermined condition, the transmitter can simultaneously grasp the state of all members at an appropriate timing without reading the messages, etc. reporting the process of the work from each receiver.

In addition, a transmitter can confirm the offered terms of a plurality of receivers in a listing format by providing a column containing a receiver-requested term in a transmission message and displaying the offered term on the offered term table 171, or displaying the offered term for each of all receivers. Therefore, the term can be easily adjusted between a member and a leader, that is, the transmitter without reading a message from each receiver.

Furthermore, if a message is a confidential message, the information limiting the transfer of the message is set for the message, thereby preventing the confidential message from being mistakenly transferred to others by suppressing the transfer, displaying before transfer a warning that the message is a confidential message, or displaying the message in an emphasized format such that the confidential message can be easily recognized even if a receiver of the message mistakenly instructs the confidential message to be transferred.

In addition, by setting a condition for deleting a message, automatic deletion of a message or deletion by a receiver or a transmitter can be specified when a predetermined condition is satisfied, for example, when all members complete their jobs, thereby preventing an unnecessary message from being displayed on the screen all the time.

Figure 18:
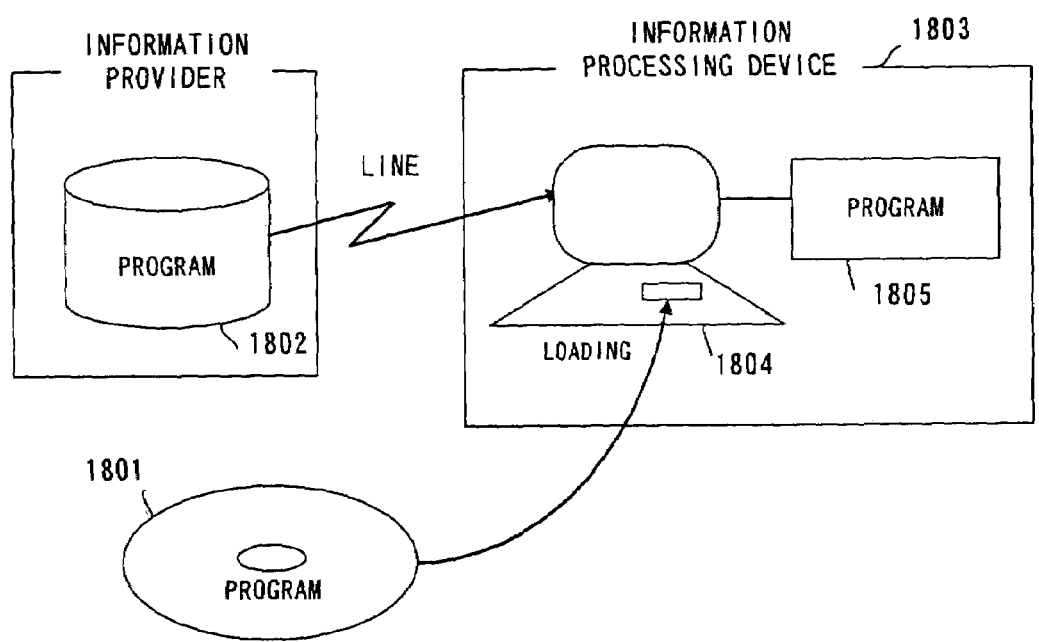
FIG. 18 shows a storage medium.

FIG. 18 shows the case in which the message management program 14 executed by the above described message processing device is stored in a portable storage medium 1801 such as CD-ROM, a floppy disk, etc., or in a storage device of a program provider, and a program 1802 is loaded onto a processing device 1803 of a user for execution.

When the message management program 14 is stored in the portable storage medium 1801 such as CD-ROM, a floppy disk, etc., the portable storage medium 1801 is inserted into a drive device 1804 of the processing device 1803, the program is read, the read program is stored in memory 1805 such as RAM, a hard disk, etc., and the program is executed.

In addition, when a program is provided from a program provider through a communications line, the message management program 14 stored in the storage device, memory, etc. of the program provider is received by the processing device 1803 through the communications line, and the received message management program 14 is stored in the memory 1805 such as RAM, a hard disk, etc. for execution.

In the above described embodiment, the message processing apparatus 13 stores the message management program 14, the message file 15, transmitted and received messages, etc. However, they can be stored in a device external to the message processing apparatus 13, and the message processing apparatus 13 can access the storage device to write or read a message to or from the device.

According to the present invention, the information indicating the opening state of a message, the information indicating the completion state of the job associated with the message, or the information indicating the expiration of the term of a job are forcibly displayed on a terminal device.

Therefore, the transmitter or the receiver of the message can be correctly and simultaneously informed at what rate the message is opened by receivers, at what rate the work has been completed, or whether or not the term has expired. In addition, since the transmitter can be informed of an individual offered term of a receiver for a specified term, the transmitter can simultaneously grasp the offered terms of receivers, and adjust the entire term. Furthermore, for example, a message to be communicated for a periodically opened conference can be stored in an event file in a time-series multiple level structure. An event announcement table is generated from the event file and displayed when a message is generated, and a message is generated according to the event announcement table, thereby avoiding failing to generating a necessary message. Since a plurality of events in the received messages can be collectively grasped according to the event announcement table on the reception side, a user can, for example, remember to attend a conference. In addition, by setting information limiting the transfer of a confidential message in a message, the confidential message can be prevented from being mistakenly transferred to other receivers. Furthermore, the deletion condition of a message can be set so that the message can be automatically or arbitrarily deleted by a transmitter or a receiver, thereby preventing an unnecessary message from being displayed for a long time, or stored in a message processing device.

What is claimed is:

1. A message processing apparatus, comprising:
   a message generation unit generating a job completion date message to which attached is an entry space for entering a completion date offer indicating a completion date a receiver of a group who has been assigned to the job desires to agree to place in the completion date offer entry space in the message;
   an acquisition unit transmitting the job completion date messages to a plurality of receivers of the group and receiving each completion date offer that is entered by the receivers; and
   a control unit causing a terminal device of the transmitter apparatus at the transmitter of the message to display the completion date offers of the receivers together with a decision result with respect to the completion date offers of the receivers.

2. A message processing system constituted from a plurality of terminal apparatuses each having a capability of displaying a message and a message processing apparatus capable of processing the message, wherein the message processing system comprises:
   a message generation unit generating a job completion date message to which attached is an entry space for entering a completion date offer indicating a completion date a receiver of a group who has been assigned to the job desires to agree to place in the completion date offer entry space in the message;
   an acquisition unit transmitting the job completion date messages to a plurality of receivers and receiving each completion date offer entered by the receivers, and
   a control unit causing one of the terminal apparatuses to display the completion date offers of the receivers together with a decision result with respect to the completion date offers of the receivers.

3. The message processing system according to claim 2, wherein
   the control unit causes the apparatus to display an offered term table comprising the name of a receiver, the offered new date term of a receiver, an approved or rejected status of the transmitter for the offer.

4. A method of managing messages, comprising:
   generating a job completion date message to which attached is an entry space for entering a completion date offer indicating a completion date a receiver of a group who has been assigned to the job desires to agree to place in the completion date offer entry space in the message;
   transmitting the job completion date messages to a plurality of receivers of the group and receiving each completion date offer that is entered by the receivers; and
   causing a terminal device of the transmitter apparatus at the transmitter of the message to display the completion date offers of the receivers together with a decision result with respect to the completion date offers of the receivers.

5. The method of managing messages according to claim 4, further comprises causing the apparatus to display an offered term table comprising the name of a receiver, a new date offered term of a receiver, an approved or rejected status of the transmitter for the offer.

6. A computer-readable storage medium for controlling a computer and storing a message management program comprising:
   a first program part for generating a job completion date message to which attached is an entry space for entering a completion date offer indicating a completion date a receiver of a group who has been assigned to the job desires to agree to place in the completion date offer entry space in the message;
   a second program part for transmitting the job completion date messages to a plurality of receivers of the group and receiving each completion date offer that is entered by the receivers; and
   a third program part for causing a terminal device of the transmitter apparatus at the transmitter of the message to display the completion date offers of the receivers together with a decision result with respect to the completion date offers of the receivers.

7. A message processing apparatus, comprising:
   a message generation unit generating a message to which attached is an entry space for entering a completion date offer indicating a completion date each receiver desires to agree in place of the completion date stated in the message; and
   a control unit causing a terminal apparatus to display in a table form the title of the message, names of a plurality of the receivers, the completion dates entered into the entry spaces attached to the message by the plurality of the receivers respectively together with a decision result with respect to the completion date offers of the receivers.

8. The message processing apparatus according to claim 7, wherein the control unit causing the apparatus to display an offered term table comprising the name of a receiver, a new date offered term of a receiver, an approved or rejected status of the transmitter for the offer.

9. The message processing apparatus of claim 1, further comprising:
   an acquisition unit transmitting a job completion message and receiving a job completion reply from persons in a group who have been assigned part of a job and obtaining information indicating whether each of a plurality of receivers of a message, who in a group do a job associated with the message, has completed an assigned part of the job; and
   a control unit, based on the information obtained by the acquisition unit, causing a terminal apparatus to display information indicating a ratio of persons who have received the message and completed the assigned parts of the job to all the persons who have received the message and have been assigned the parts of the job.

10. The message processing apparatus according to claim 9, wherein the control unit causes the information indicating the ratio of the persons who have completed respectively assigned parts of the job to be displayed together with a title of the message in response to one of a display request of a user and on fulfilling predetermined conditions.

11. The message processing apparatus according to claim 9, wherein the control unit causes the terminal apparatus to display a completion state table comprising the information indicating the ratio of the persons who have completed the respectively assigned parts of the job among all the plurality of receivers of the message doing the job and the title of the message.

12. The message processing apparatus according to claim 9, further comprising:
 a message generation unit generating a message provided with a confirmation button by which each receiver of the message can individually inform that the receiver has completed the assigned part of the job to the transmitter of the message; and
 wherein the control unit judges when the confirmation button is activated by a receiver of the message that the receiver has completed the assigned part of the job and counts the number of receivers who have activated the confirmation button for causing the terminal apparatus to display the information indicating the ratio of the persons having completed the assigned parts of the job.

13. The message processing apparatus according to claim 9, wherein the control unit causes the terminal apparatus at the transmitter of the message or at the receiver of the message to mandatory display the information indicating the ratio of the persons who have completed the respectively assigned parts of the job among all the plurality of receivers of the message doing the job that is associated with the message.

14. The message processing apparatus according to claim 9, wherein the control unit causes the terminal apparatus to display the information indicating the ratio of the persons who have completed the assigned parts of the job when one of a specified date for completing is a current and when the ratio of the persons who have completed the assigned parts of job reaches a preassigned value.

15. The message processing apparatus according to claim 9, wherein the control unit causes the terminal apparatus to display the information indicating the ratio of the persons who have completed the assigned parts of the job on a day specified by a transmitter of the message in advance.

* * * * *